United States Patent [19]
Gunn et al.

[11] Patent Number: 5,306,116
[45] Date of Patent: Apr. 26, 1994

[54] SURGE CONTROL AND RECOVERY FOR A CENTRIFUGAL COMPRESSOR

[75] Inventors: John T. Gunn, Charlotte; Daniel T. Martin, Clemmons; William H. Harden, Yadkinville, all of N.C.

[73] Assignee: Ingersoll-Rand Company, Woodcliff Lake, N.J.

[21] Appl. No.: 29,195

[22] Filed: Mar. 10, 1993

Related U.S. Application Data

[63] Continuation-in-part of Ser. No. 867,304, Apr. 10, 1992.

[51] Int. Cl.$^5$ ............................................. F04D 27/02
[52] U.S. Cl. ...................................... 415/27; 415/17; 364/431.02
[58] Field of Search ................... 415/1, 17, 27; 364/431.02

[56] References Cited

U.S. PATENT DOCUMENTS

| | | | |
|---|---|---|---|
| 4,464,720 | 8/1984 | Agarwal | 415/17 |
| 4,560,319 | 12/1985 | Blotenberg | 415/27 |
| 4,640,665 | 2/1987 | Staroselsky et al. | 415/27 |
| 4,656,589 | 4/1987 | Albers et al. | 415/17 |
| 4,749,331 | 6/1988 | Blotenberg | 415/47 |
| 4,763,473 | 8/1988 | Ziplies et al. | |
| 4,781,524 | 11/1988 | Blotenberg | 415/27 X |
| 4,789,298 | 12/1988 | Blotenberg | 415/27 |
| 4,791,569 | 12/1988 | Suzuki | |
| 4,807,150 | 2/1989 | Hobbs | 415/11 |
| 4,831,534 | 5/1989 | Blotenberg | 415/15 |
| 4,831,535 | 5/1989 | Blotenberg | 415/17 X |
| 4,834,622 | 5/1989 | Smith | 419/307 |
| 4,936,740 | 6/1990 | Blotenberg | 415/27 |
| 4,936,741 | 6/1990 | Blotenberg | 415/27 |
| 4,938,658 | 7/1990 | Blotenberg | 415/27 |
| 4,944,652 | 7/1990 | Blotenberg | 415/27 |
| 4,946,343 | 8/1990 | Blotenberg | 415/27 |
| 4,948,332 | 8/1990 | Blotenberg | 415/27 |
| 4,949,276 | 8/1990 | Staroselsky | 415/17 |
| 4,968,215 | 11/1990 | Blotenberg | 415/27 |
| 5,002,459 | 3/1991 | Swearingen et al. | 415/17 |
| 5,032,062 | 7/1991 | Peterson | 417/282 |
| 5,046,928 | 9/1991 | Peterson | 417/282 |
| 5,095,714 | 3/1992 | Adachi et al. | 62/197 |

OTHER PUBLICATIONS

SAE Technical Paper Series 870385.
SAE Technical Paper Series 870777.

*Primary Examiner*—Edward K. Look
*Assistant Examiner*—Michael S. Lee
*Attorney, Agent, or Firm*—Victor M. Genco, Jr.

[57] ABSTRACT

A method and apparatus for controlling working fluid surge in a centrifugal compressor include preventing surge by using a variable-speed prime-mover to achieve a minimum desired surge margin. Surge prevention is also accomplished by continuously modulating a blow-off valve to maintain an actual compressor pressure ratio at a predetermined target maximum value. Surge detection is accomplished by monitoring the time rate of change of the final stage discharge pressure.

8 Claims, 13 Drawing Sheets

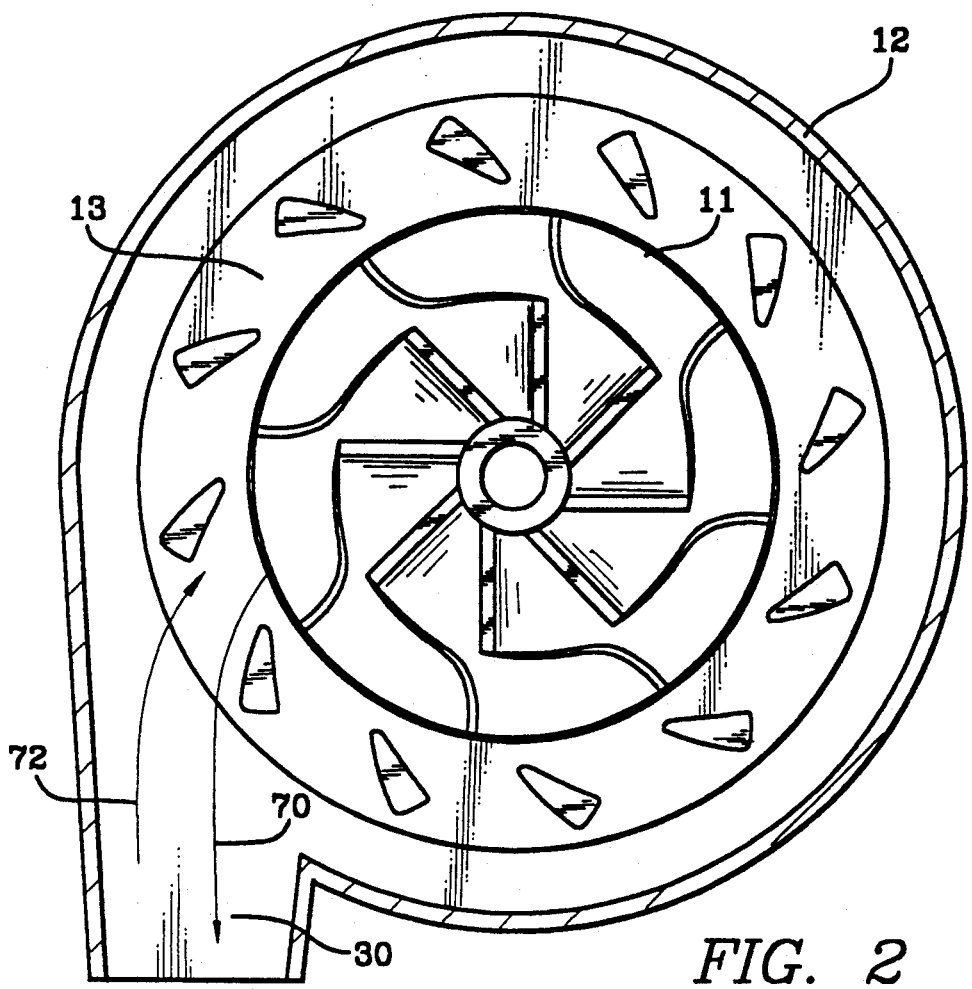
FIG. 2
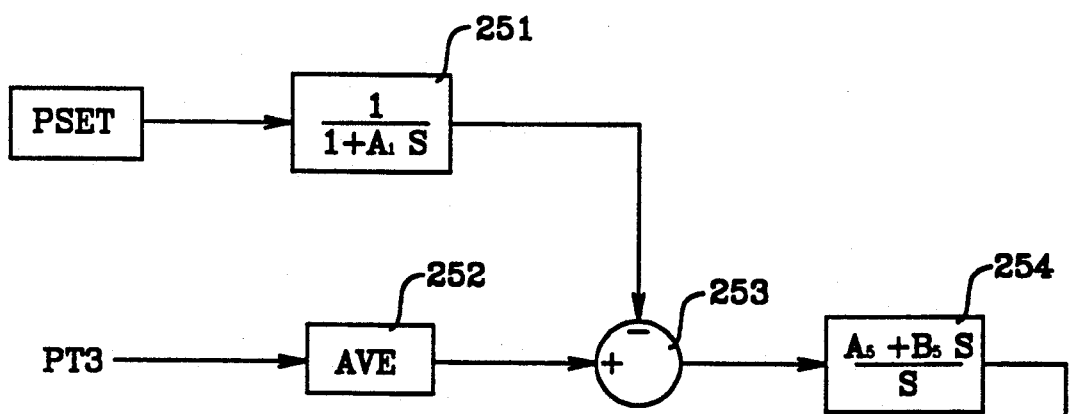
FIG. 4

SURGE CONTROL AND RECOVERY FOR A CENTRIFUGAL COMPRESSOR

This is a continuation-in-part application of application Ser. No. 07/867,304 filed on Apr. 10, 1992.

BACKGROUND OF THE INVENTION

This invention generally relates to centrifugal compressors, and more particularly to methods for controlling and detecting surge within a centrifugal compressor.

Surge occurs when the flow through the compressor is suddenly reduced. The process of surge within a centrifugal compressor results in transient unstable flow of a working fluid within the centrifugal compressor during the surging process. Typically, surge is accompanied by loud objectionable noises, and surge may cause structural damage and fatigue to the centrifugal compressor, either initially or during the life of the centrifugal compressor. More particularly, surge may cause the following to occur to a centrifugal compressor: damage to centrifugal impellers, overheating and overloading of compressor bearings which may cause bearing destruction, fatigue and overheating of centrifugal compressor piping, and overheating of other compressor components.

Presently, there exist centrifugal compressor control systems which are "reactive" to a surge process, and which merely unload the centrifugal compressor after surge occurs. However, in such compressor control systems, the initial stages of surge have already occurred by the time corrective action is taken. Additionally, in order for these control systems to function, the centrifugal compressor is nearly completely unloaded which thereby reduces the fluid output of the associated centrifugal compressors.

Prior art compressor control systems have employed numerous methods for detecting surge. A method used in prior art devices includes the use of a flow meter, such as a venturi nozzle, which is placed in a compressor discharge conduit with appropriate signals to the control system to indicate if a flow reversal has occurred. This method typically is costly, inaccurate, and causes additional system pressure losses. Another method employed in the prior art is premised upon the rate of rise of temperature of the working fluid at the inlet conduit to a centrifugal compressor stage. This method typically responds slower than desired.

The foregoing illustrates limitations known to exist in present centrifugal compressor surge control systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of preventing fluid surge in a centrifugal compressor which includes sensing ambient absolute pressure; generating a first signal corresponding to the ambient absolute pressure; sensing ambient temperature at the inlet port of the compressor; generating a second signal corresponding to the ambient temperature; selecting a predetermined setpoint discharge pressure for the compressor; generating a third signal corresponding to the setpoint discharge pressure; and inputting the first, second and third signals to a controller. The controller has stored therein mapped compressor surge speed data at which fluid surge occurs. Compressor speed is calculated as a function of the ambient absolute pressure, the ambient temperature, and the setpoint discharge pressure. The compressor speed is maintained a predetermined minimum margin from the mapped compressor surge speed to prevent a fluid surge.

The foregoing and other aspects will become apparent from the following detailed description of the invention when considered in conjunction with the accompanying drawing figures.

BRIEF DESCRIPTION OF THE DRAWING FIGURES

FIG. 2 is a partial cross-sectional view of a single compressor stage used in the centrifugal compressor of FIG. 1;

FIG. 4 is a block diagram which provides the control transfer functions used by the controller of the FIG. 3 embodiment to control the inlet valve or unloader of FIGS. 1 and 3;

DETAILED DESCRIPTION

Figure 1:
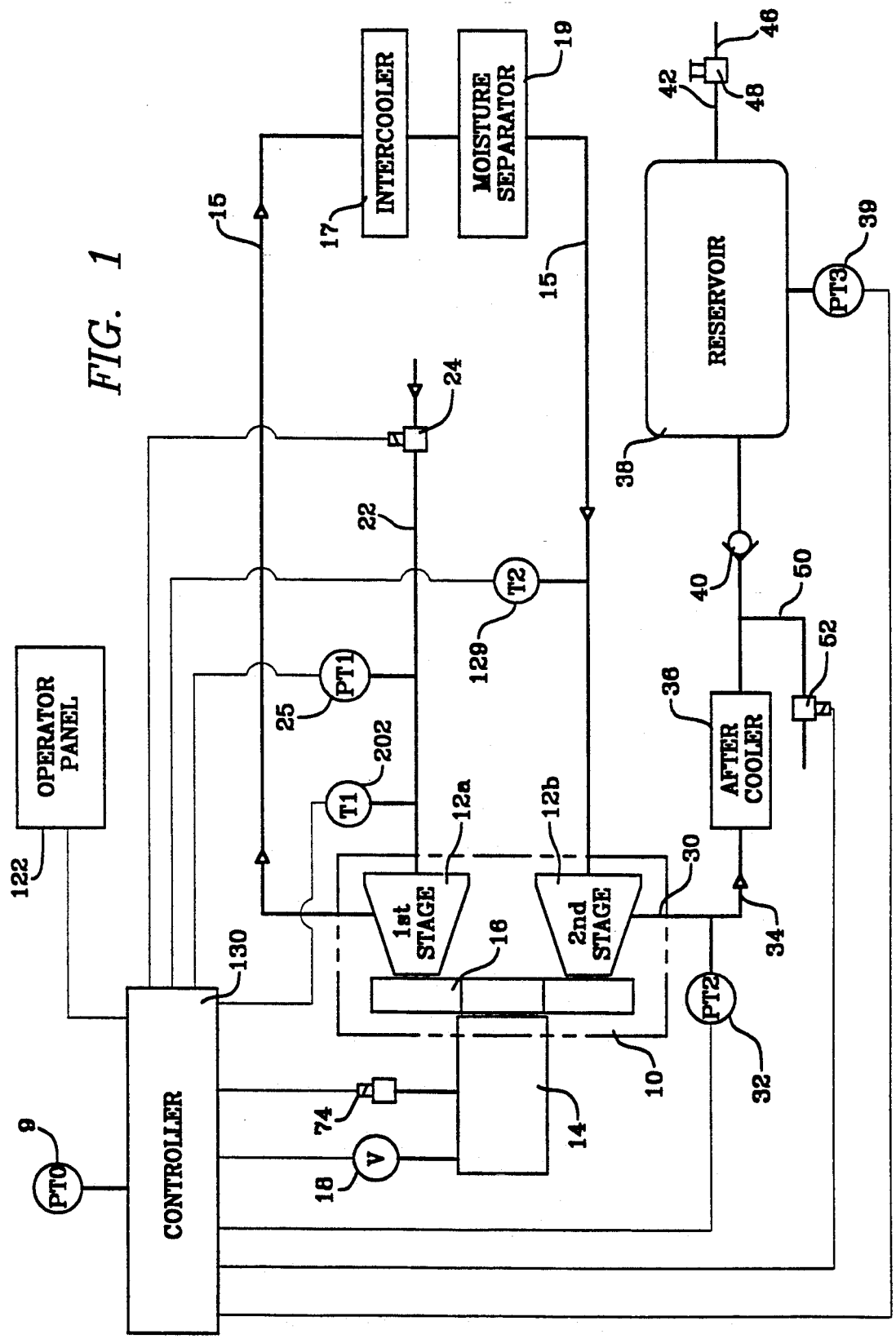
FIG. 1 is a schematic diagram of an apparatus for detecting, preventing and recovering from a surging state in a compressor constructed in accordance with the invention.

A centrifugal compressor is generally illustrated at 10 in FIG. 1. The term centrifugal compressor, as used throughout this specification, applies to centrifugal pumps and centrifugal compressors, as well as any centrifugal device which displaces a working fluid, which in this specification is intended to cover any fluid including gases, typically air, or liquids by a centrifugal action. The centrifugal compressor 10 includes a first compressor stage 12a and a second compressor stage 12b of conventional design. Although only two compressor stages 12a, 12b are illustrated in FIG. 1, anywhere from one to ten or more compressor stages may be connected for series fluid communication.

As best seen by reference to FIG. 2, each compressor stage 12a and 12b includes a centrifugal impeller 11 and a diffuser portion 13 through which a working fluid is discharged. The impeller 11, which rotates at high speeds, is aerodynamically configured to provide a fluid pressure rise which is accompanied by a characteristic fluid velocity increase. The diffuser portion 13 is configured in a manner well known in the art to decrease the velocity of the fluid passing from the centrifugal impeller to thereby provide an additional working fluid pressure rise.

Turning to FIG. 1, the compressor stages 12a and 12b are conventionally driven by a gear system 16 which is disposed in motive force receiving relation to a variable-speed prime mover 14. In this specification, the term "prime mover" is intended to cover internal combustion engines, electric motors or any device which transmits motive force or delivers work to the compressor 10. A coupling (not shown) is used to connect the prime mover 14 to the compressor 10. Angular velocity of the prime mover 14 is sensed by an angular velocity sensor 18. A controller 130 performs a plurality of functions as will be explained in the paragraphs to follow. A microcomputer which may be used in the application as the controller 130 is the INTEL 80C196. (INTEL is a trademark of the Intel Corporation.)

The first stage 12a and the second stage 12b are disposed in series fluid communication by an interstage conduit 15. An intercooler 17 and a moisture separator 19 are disposed in the interstage conduit to prepare the working fluid passing between the two stages to a condition where it can be compressed through the second stage.

Working fluid is supplied to the first compressor stage 12a by an inlet conduit 22. Flow of the working fluid through the inlet conduit 22 is regulated by a suitable inlet valve or throttling device 24. Under normal compressor operating conditions, the inlet valve 24 is regulated by the controller 130 as will be described in detail hereinafter. As should be understood, the inlet valve 24 includes a means to prevent its full closure to provide the compressor 10 a minimum flow of working fluid for non-surging operation during startup and during idle speed operation. The means to prevent full closure of inlet valve 24 may be either mechanical, such as a valve position stop, for example, or electrical, such as a minimum electrical signal to the inlet valve positioning system as directed by the controller 130, for example. A first pressure sensor or transducer 25 measures the pressure of the working fluid contained within the inlet conduit 22. As the inlet valve 24 is opened, the absolute pressure in the inlet conduit 22 increases, and the amount of working fluid the centrifugal compressor is capable of displacing increases. A temperature sensor 202 measures the temperature of the working fluid entering from the first stage 12a. Another temperature sensor 129 measures the temperature of the working fluid entering the second stage 12b.

After the working fluid passes through the second stage 12b, it enters a discharge port 30. A second pressure sensor or transducer 32 measures fluid pressure at the discharge port 30. The discharge port 30 is in fluid communication with a discharge conduit 34 which is disposed in fluid supplying relation to an aftercooler 36 which returns the working fluid to a desired final temperature after the fluid exits the second stage 12b. The working fluid leaving the aftercooler 36 flows through a check valve 40 and into a reservoir 38 for containing pressurized working fluid. A pressure sensor 39 measures pressure in the reservoir 38. A service line 42 is disposed in fluid communication with the reservoir 38 which permits the working fluid to be supplied to an object of interest, such as a service outlet 46. A service valve 48 limits the application of the fluid contained within the reservoir 38 to the service outlet 46. In this specification, the discharge port 30 is defined as being contained within the discharge conduit 34.

A blowoff conduit 50 is disposed in fluid communication with the discharge conduit 34. Connected in fluid communication to the blowoff conduit 50 is a blowoff valve 52 which is variably positionable to permit control of fluid flow from the discharge conduit 34 to the atmosphere. The inlet valve 24 and the blowoff valve 52 interact with the first and second compressor stages 12a, 12b to control the fluid pressure applied to the interstage conduit 15 and the discharge conduit 34 in a manner well known in the art. Positioning of the blowoff valve 52 is regulated by the controller 130 using logic which is provided in FIGS. 3 and 13, and which is described in further detail hereinafter.

The configuration of the centrifugal stages 12a, 12b for centrifugal compressors is what permits a phenomenon called surge. Surge is one of the primary operational limitations of centrifugal compressors. For any particular aerodynamic impeller configuration, there exists a maximum pressure ratio that the impeller is capable of producing when rotating at a particular speed with a particular working fluid condition. Surge is permitted since fluid flow is possible, under distinct times and conditions, in both a forward direction 70 and a reverse direction 72 between centrifugal impellers 12 and the discharge port 30, as illustrated by FIG. 2. Surge occurrence is best understood in terms of a compressor performance map.

Figure 5:
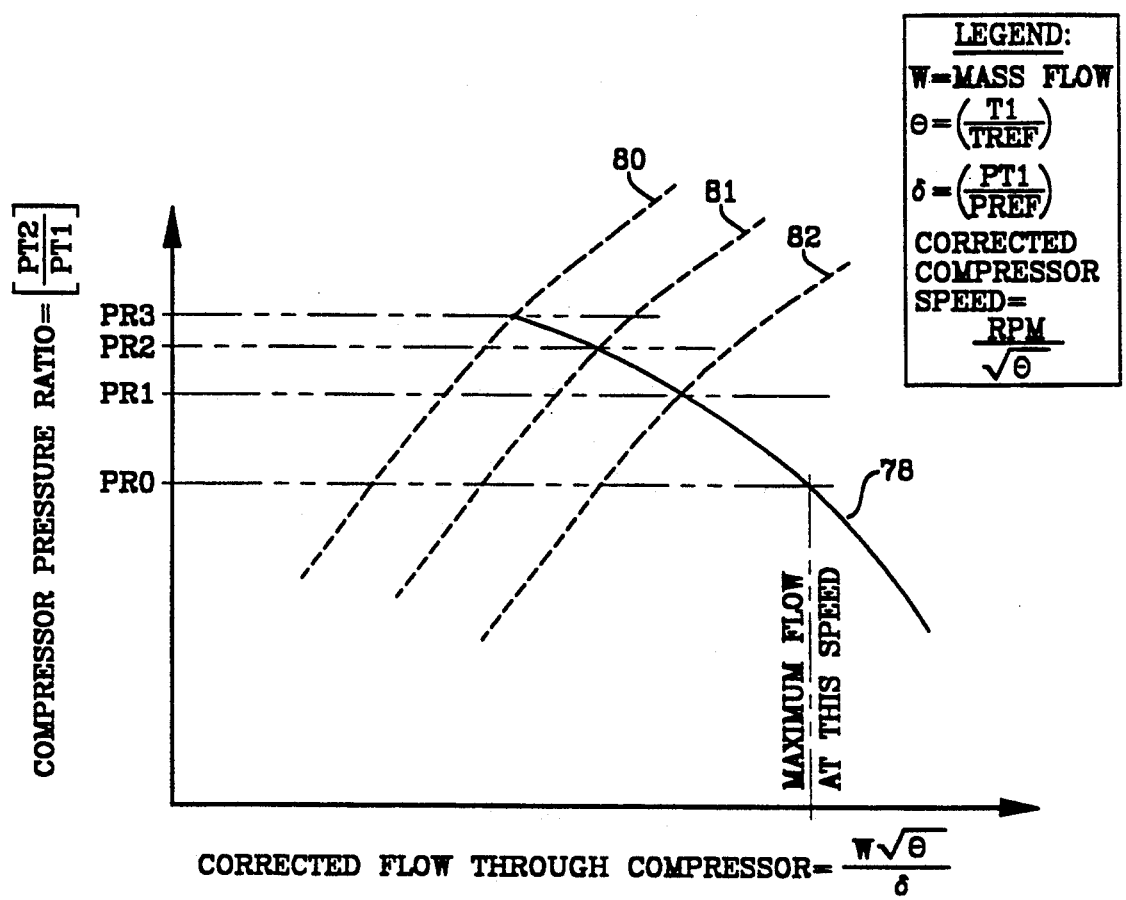
FIG. 5 is a characteristic compressor map of compressor pressure ratio versus compressor mass flow for varying corrected compressor speeds, and which includes a "surge line" at which surge will occur at any combination of compressor flow and compressor speed.

FIG. 5 provides a characteristic map of the performance achievable with a particular centrifugal compressor. FIG. 5 is a graph of overall compressor pressure ratio versus a flow parameter used to indicate the mass flow of fluid passing through the compressor corrected for fluid conditions at the inlet to the compressor. Various corrected speed lines are shown on the compressor map of FIG. 5 and are explained in detail hereinafter.

FIG. 5 illustrates a "surge line" 80 at which the compressor 10 is unable to operate in the region to the left of this line. The surge line 80 defines a locus of upper limits of corrected speed lines, and defines a critical pressure ratio PR3. For a particular compressor speed, a speed parameter, usually called "corrected speed", is characterized by a quotient of the physical compressor speed and an arithmetic function of the temperature of the working fluid in the inlet conduit 22 (see FIG. 5). Thus, the speed parameter or "corrected speed" can be increased by either increasing physical compressor speed or by reducing the temperature of the working fluid at the compressor inlet. Accordingly, and as shown in FIG. 5, at higher corrected compressor speeds, the centrifugal compressor 10 is capable of operating at higher pressure ratios before the surge line is reached.

Figure 6:
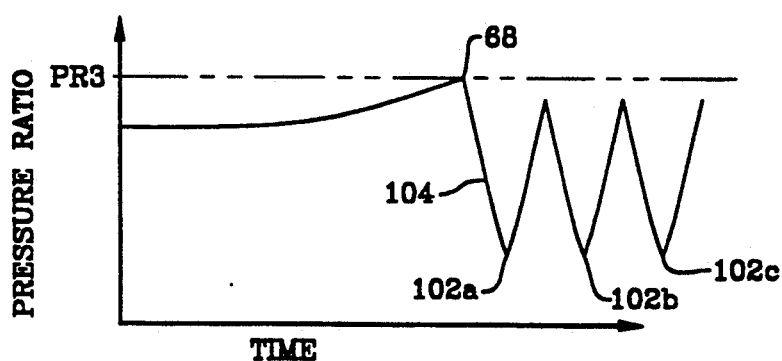
FIG. 6 is a graph of discharge pressure versus time of a "prior art" embodiment of a centrifugal compressor which is experiencing surge, and which does not include a device or system for surge prevention, detection, control, and recovery.

FIG. 6 is a graph of discharge pressure versus time of a "prior art" embodiment of a centrifugal compressor which is experiencing surge, and which does not include a device or system for surge prevention, detection, control, and recovery. Assuming the compressor of FIG. 6 initially operates in a stable condition, if a sudden decrease in compressed working fluid demand occurs, typically from service outlet 46, the compressor discharge pressure in both the reservoir 38 and the discharge conduit 34 rises. As should be understood, the term "pressure ratio", as used herein, is defined as the quotient of the working fluid absolute pressure applied to the discharge port 30, as sensed by the discharge pressure sensor 32, divided by the working fluid absolute pressure applied to the inlet conduit 22, as sensed by the inlet pressure sensor 25. Unless otherwise specified herein, pressure sensors measure absolute pressures.

Centrifugal impeller 11 and diffuser portion 13 combinations are capable of operating up to only a specified range of pressure ratios. If the pressure ratio is increased above a specified value, called the surge point 68 which is illustrated in FIG. 6, then the centrifugal impellers are unable to maintain working fluid flow in the forward direction 70, and, in such a case, the working fluid actually flows in the reverse direction 72. Therefore, when the overall compressor ratio rises to the surge pressure ratio, (upper dashed line in FIG. 5) a surge event occurs. The reversal of flow in the direction 72 accompanying the surge continues until the pressure ratio falls below a predetermined level, and then with the decreased pressure ratio, fluid flow can once again begin in the forward direction 70.

As shown in FIG. 6, surge is accompanied by a sharp down spike in compressor discharge pressure which is followed by a rise in compressor discharge pressure as the compressor restabilizes. With the condition that caused the surge occurrence still present, i.e. the sudden decrease in compressed working fluid demand from service outlet 46, the surge event will continue to occur. Each time a surge event occurs, the fixed volume of working fluid contained in the conduit 15 or conduit 34 will suddenly reverse flow direction, and flow backwards toward the compressor inlet conduit 22. As the impeller reloads under the lower pressure ratio conditions, the working fluid will again move in the normal direction until the surge spike happens again. These fluctuations of pressure ratio repeat in a frequent and violent manner as characterized by pressure spikes 102a, 102b, and 102c in FIG. 6.

The series of pressure spikes 102a, 102b, 102c, may be characterized as an alternating pressure wave which is transmitted through the working fluid. As the working fluid is alternated forward and backwards as a result of the pressure spikes 102a, 102b, 102c, the energy being transferred to the working fluid by the prime mover 14 is manifested in heat with an accompanying rise in the temperature of the working fluid. Unless the surge condition is eliminated, physical damage to the compressor and/or associated components will occur. The surge control system of the present invention overcomes the weaknesses of the prior art by preventing centrifugal compressor surge from occurring in the first instance, detecting compressor surge if it should occur, and recovering from a surge event with minimum interruption of flow to the application.

Figure 3:
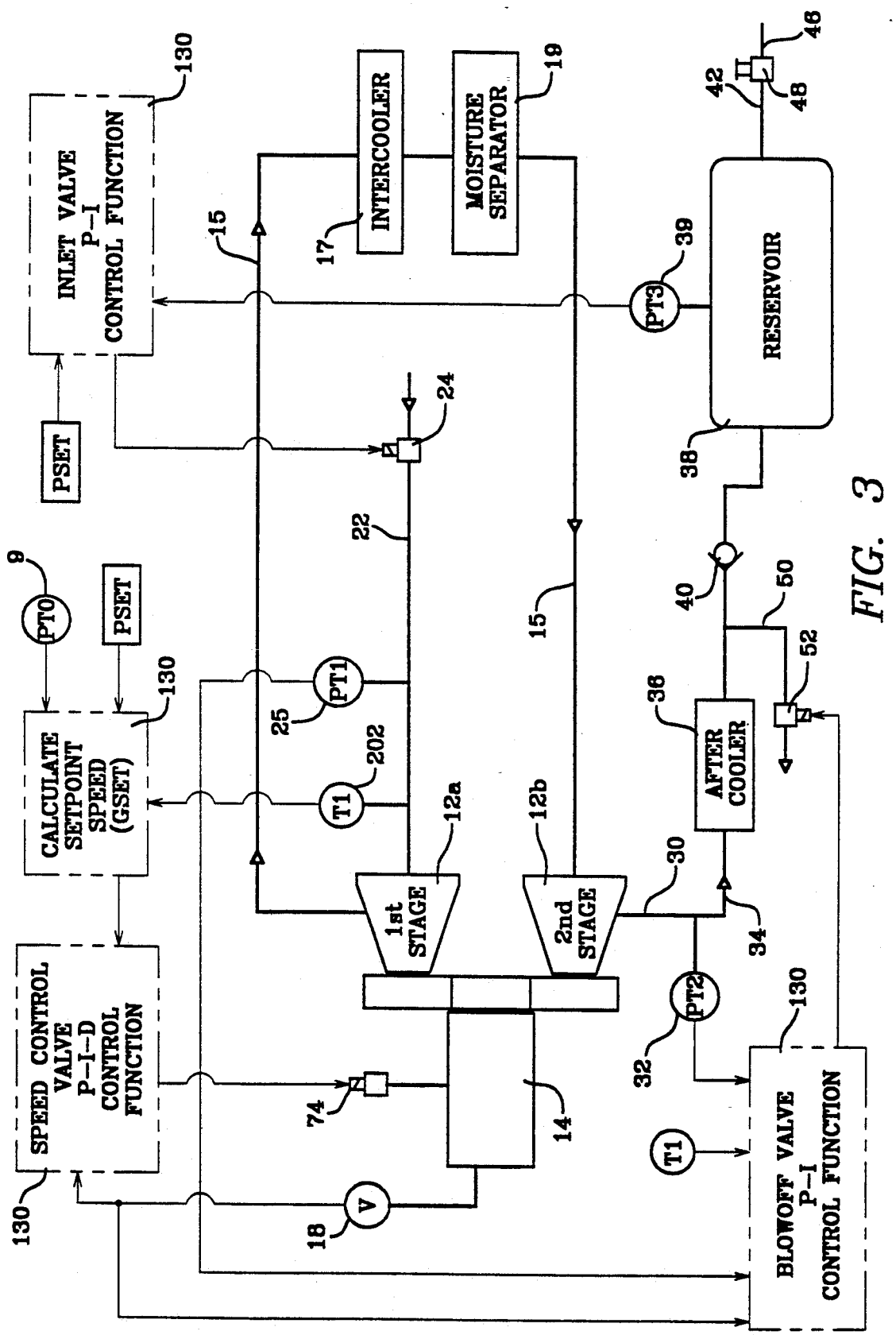
FIG. 3 is a functional block diagram which illustrates an embodiment of the apparatus of the present invention.
Figure 7:
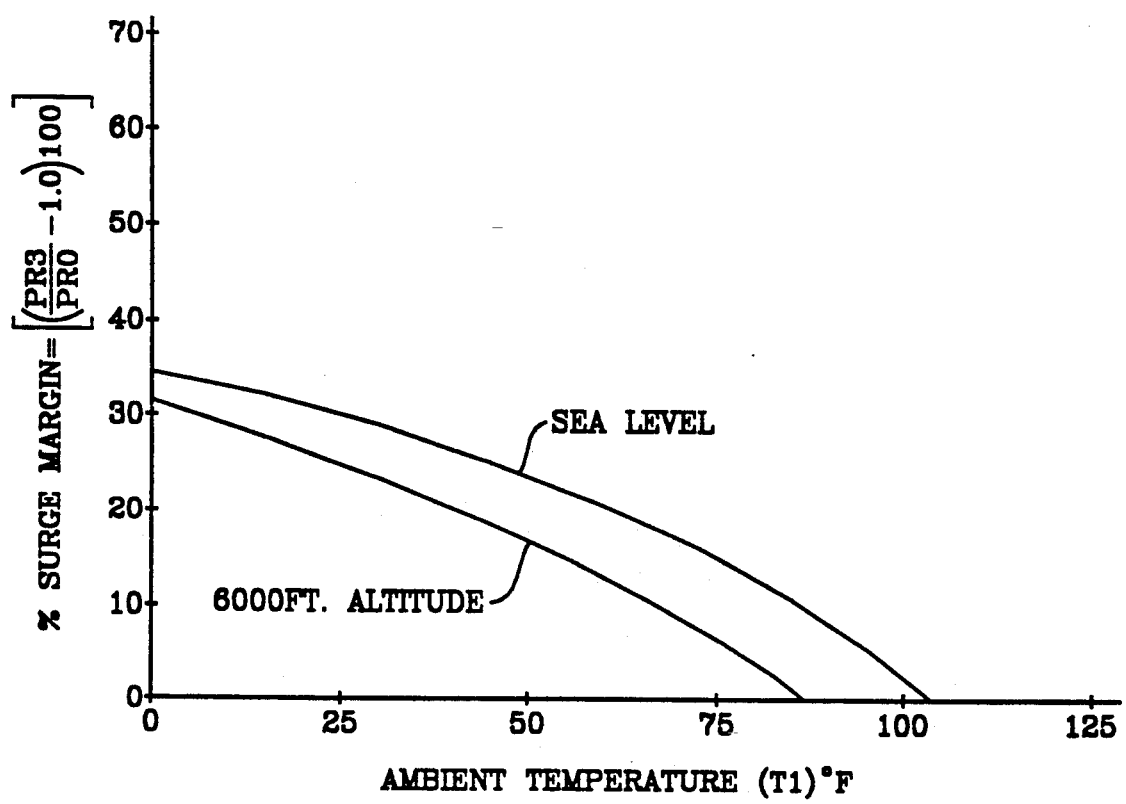
FIG. 7 is a graph of surge margin versus altitude and ambient temperature of a "prior art" embodiment of a centrifugal compressor which does not include a device for sensing and setting compressor rotational speed.
Figure 8:
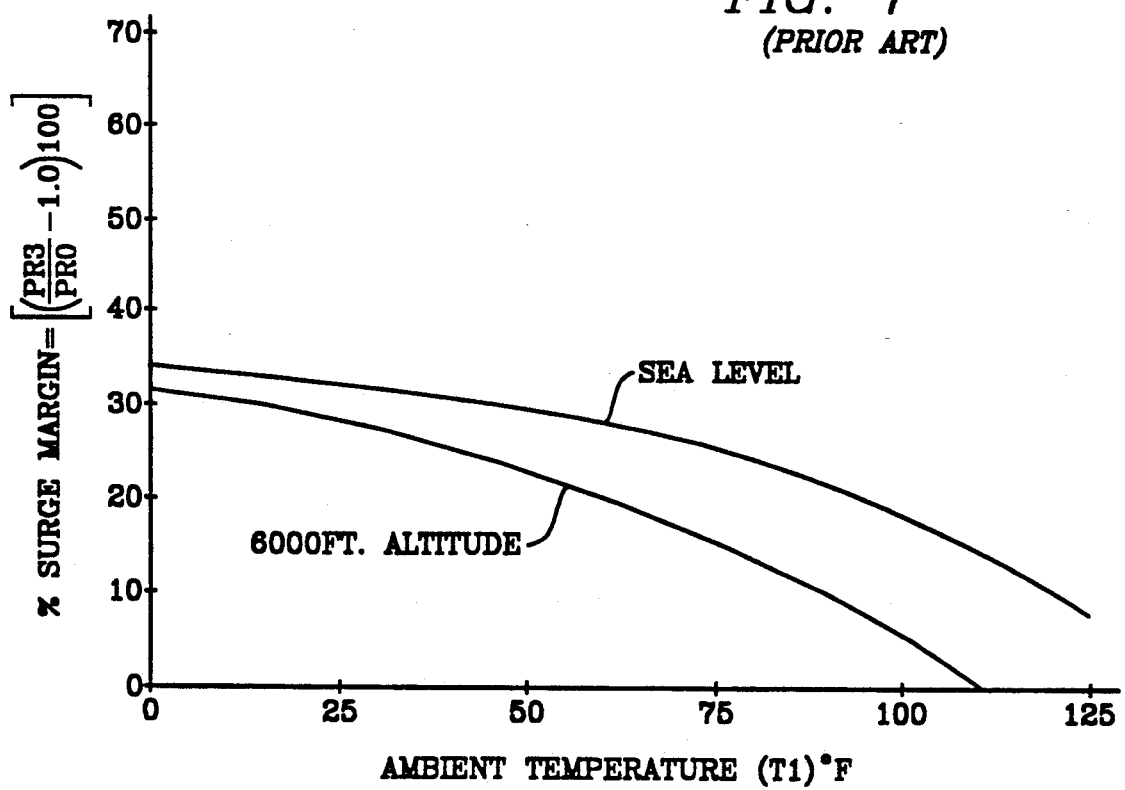
FIG. 8 is a graph of surge margin versus altitude and ambient temperature of the FIG. 3 embodiment having a prime mover which is a variable-speed driver.

FIG. 7 is a graph of surge margin versus altitude and ambient temperature of a "prior art" embodiment of a centrifugal compressor which does not include a device for sensing and setting compressor rotational speed. In the preferred embodiment, as shown in FIG. 3, the controller 130 continuously adjusts physical compressor speed or set point speed of the variable-speed prime mover 14 as a function of operating altitude, ambient temperature, and setpoint discharge pressure. In this manner, available surge margin is increased to that shown in FIG. 8 to prevent a surge event.

Setpoint speed is computed by the controller 130 using the following equations:

---

GSET = MAX {GHP, GSURGE}
GHP = A + B * T1
where,
 A, B = Linear functions of PSET and PT0
and,
GSURGE = $G_c$ * SQRT(T1/528)
where,
 T1 = Ambient Temperature (Deg. R)
 $G_c$ = Corrected speed at which surge occurs at the required pressure ratio, REQD_PR.
 REQD_PR = $F_c$ * (PSET + DP2) / PT0
 PSET = Set point pressure (psia)
 DP2 = Discharge conduit pressure drop (psi)
 PTO = Ambient pressure (psia)
 $F_c$ = Surge margin factor (e.g., 1.08)

$G_c$ is obtained by interpolation of the surge line data 80.

---

Figure 9:
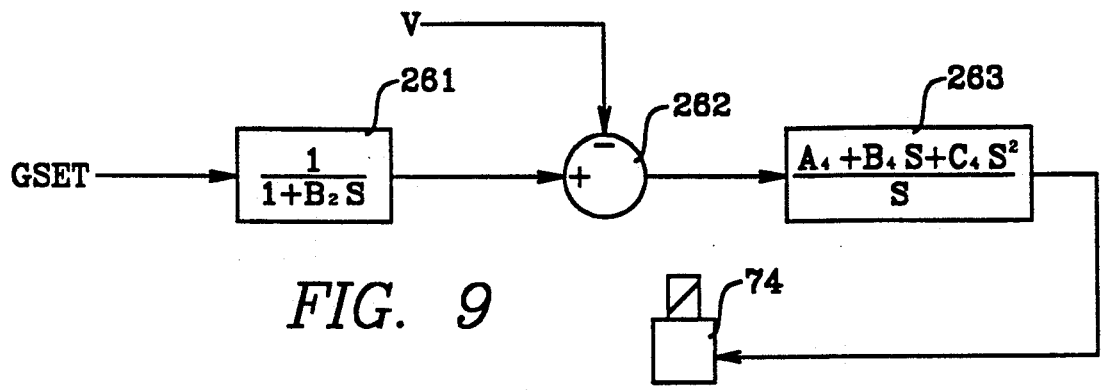
FIG. 9 is a block diagram which provides the control transfer functions used by the controller of FIG. 3 to control and maintain prime-mover speed when the prime mover is a variable-speed driver.

The controller 130 utilizes a "proportional integral derivative" or "PID" control algorithm, (see FIG. 3), to control and maintain the correct setpoint compressor speed. FIG. 9 provides the control transfer functions used by controller 130 for dynamic speed control of the speed control valve 74.

In the case of a prime mover 14 of the "constant-speed" type, such as a typical squirrel-cage electric motor operating on fixed voltage and frequency, physical compressor speed is held at a constant value and corrected speed varies only according to the variance in the temperature of the working fluid in the inlet conduit 22. For such systems, speed variance, such as that taught by the present invention, is not possible as a method of surge prevention.

While there is a continued demand for the working fluid, the working fluid exiting the discharge port 30 flows freely through the discharge conduit 34, aftercooler 36, check valve 40, reservoir 38, and service valve 48 to an object of interest. When the service valve 48 is shut off, the compressor stages 12a, 12b continue to displace working fluid into these elements which causes absolute pressure in these elements to increase. If the blowoff valve 52 does not open quickly enough, the pressure increase will cause a surge event to occur accompanied by the aforementioned flow reversal and reduction of pressure ratio characterizing the surge condition.

The apparatus of the present invention is also operable to prevent surge in the first instance by modulating the blowoff valve 52 to maintain the pressure ratio well below the critical pressure ratio PR3 where surge occurs. The critical pressure ratio PR3 is the surge point in FIG. 5 which is defined by the intersection of a particular corrected speed line and the actual surge line. FIG. 5 shows two additional lines 81 and 82 set at a predetermined distance away from, and generally aligned with, the actual surge line 80. The intersection of the corrected speed line 78 and the line 81 defines the maximum safe pressure ratio PR2. During periods of reduced flow demand, the controller 130 will modulate the blowoff valve 52 to maintain compressor pressure ratio at a target value slightly below the safe maximum pressure ratio of PR2. This actual target pressure ratio is defined as pressure ratio PR1 and is shown on FIG. 5 as dashed line 82.

Figure 10:
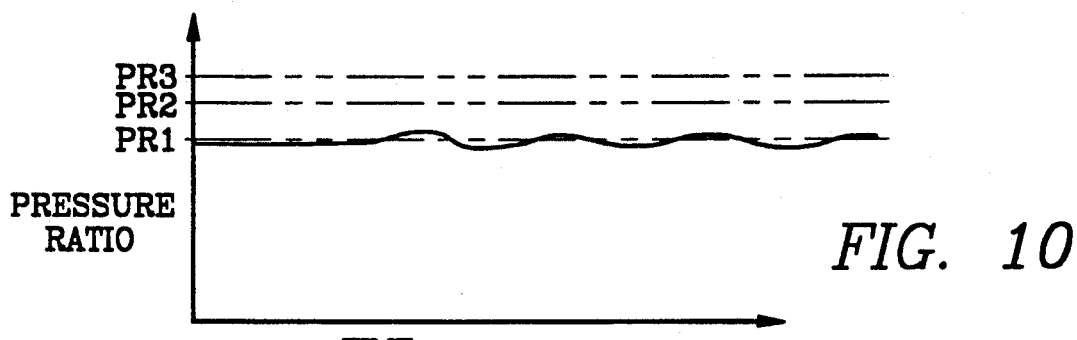
FIG. 10 is a graph of discharge pressure versus time of the FIG. 3 embodiment applying a modulating signal to the blowoff valve to maintain the pressure ratio near PR1.
Figure 11:
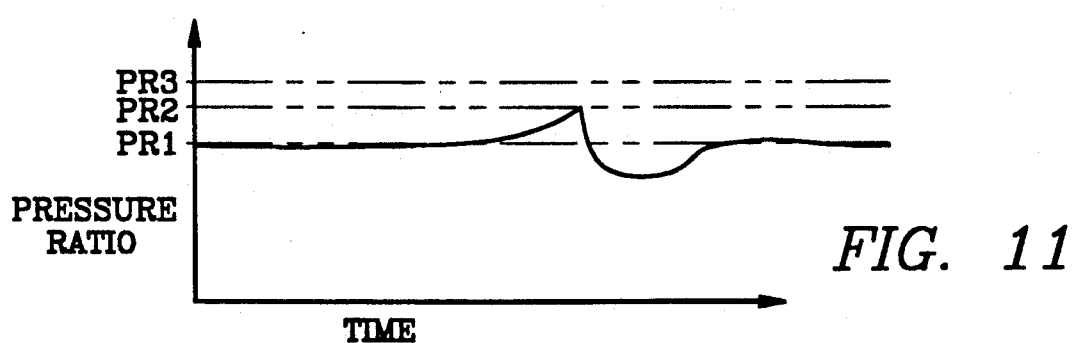
FIG. 11 is a graph of discharge pressure versus time of the FIG. 3 embodiment applying an impending surge control response to a potential surge condition.

The normal modulation of the blowoff valve 52 at pressure ratio PR1 is shown in FIG. 10. When the pressure ratio climbs above the safe maximum pressure ratio PR2, surge is very likely to occur or is imminent, and the controller 130 enters a reset mode wherein the blowoff valve 52 is quickly opened enough to relieve the pressure ratio rise. A graphic representation of this action is shown in FIG. 11 where the controller 130 is initially modulating the blowoff valve 52 to maintain compressor pressure ratio at PR1. If some external event, such as the quick closing of the service valve 48, causes compressor pressure ratio to increase above the target value of PR1 to as high as PR2 (see FIG. 11), the controller 130 will sense this increase in pressure ratio and cause the blowoff valve 52 to quickly open to some higher value. Opening the blowoff valve reduces the pressure of the working fluid at the discharge port 30 thereby reducing the pressure ratio. Reducing the pressure ratio in turn decreases the possibility of an occurrence of flow of working fluid in the reverse direction 72.

Figure 13:
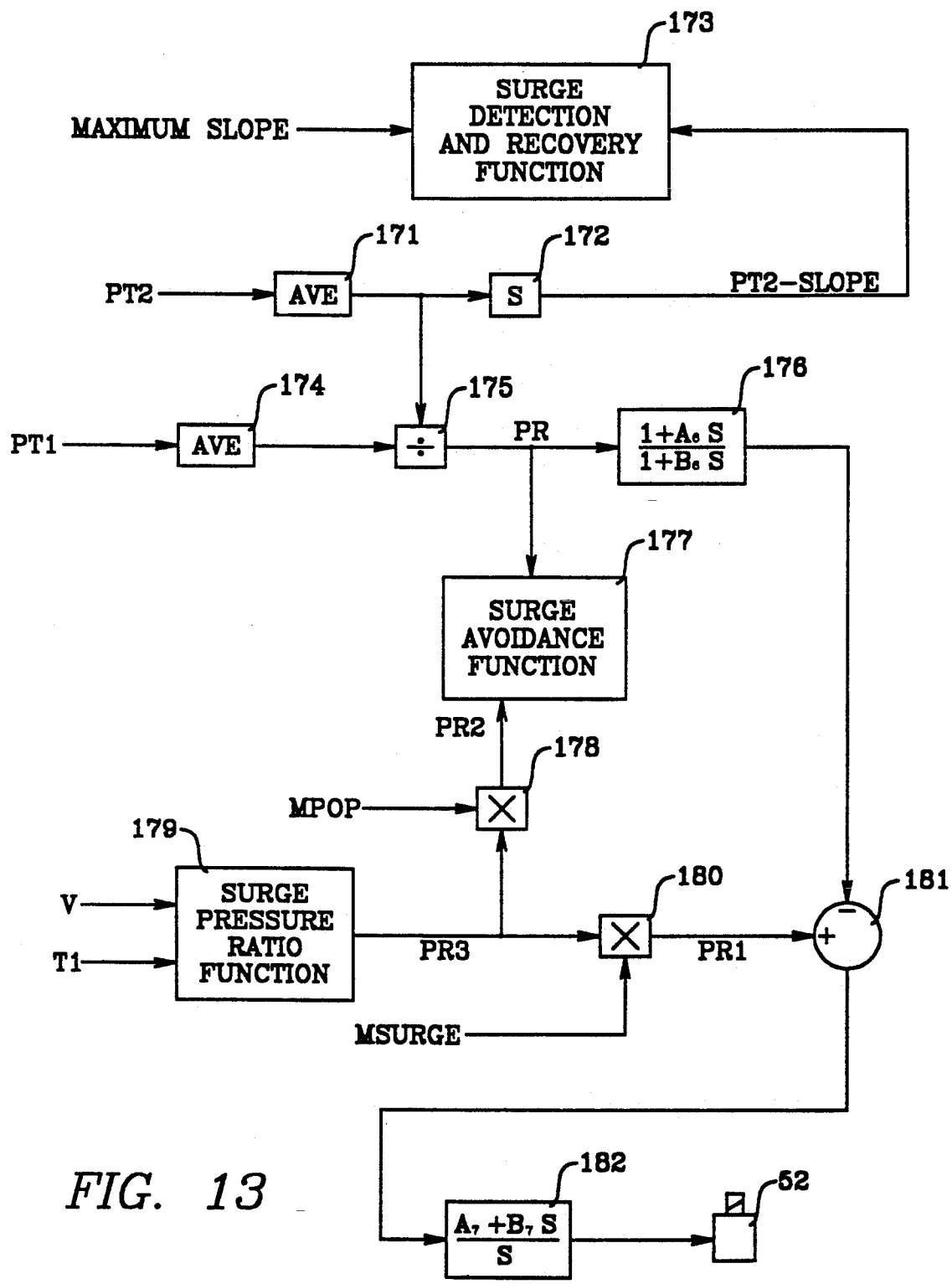
FIG. 13 is a block diagram which provides the control transfer functions used by the controller of the FIG. 3 embodiment to control the compressor pressure ratio shown in FIG. 10 as PR1.

If the prime mover 14 is of the variable-speed type, the controller 130 will also perform a "speed signal reset" simultaneously with the quick opening of the blowoff valve 52. This technique prevents compressor overspeed from occurring due to the sudden load drop associated with the blowoff valve reset function. Modulation of the blowoff valve 52 to prevent compressor pressure ratio from exceeding PR1 is accomplished by a "proportional integral" or "PI" control technique in controller 130. FIGS. 3 and 13 provide the control transfer functions used by the controller 130 in modulating the blowoff valve 52 to achieve the target safe pressure ratio PR1.

The present invention is operable to detect surge by analyzing compressor discharge pressure at the discharge port 30 by pressure sensor 32. Referring to FIG. 6, the difference in profile of the pressure spike 102 characterizing surge and a pressure ratio profile produced by other typical compressor operation is that the drop in pressure ratio in a surge, relative to time, has an extremely sharp slope. There is no other normally occurring phenomenon in the operation of the centrifugal compressor which produces as steep a slope in pressure ratio drop as the pressure spike which accompanies surge.

The controller 130 continually monitors compressor outlet pressure via sensor 32 and compressor inlet pressure via sensor 25. From the information generated by these pressure sensors, the controller 130 computes an overall compressor pressure ratio. When the absolute value of compressor discharge pressure drops faster than a predetermined rate, a probable surge is declared to have occurred. The controller 130 continues to monitor compressor discharge pressure to determine if the down spike in pressure signal is followed by an up spike in pressure as shown in FIG. 6. When detected, the controller 130 declares that a definite surge has occurred, and the controller increments a counter to count the number of definite surges which have occurred within a certain time period. Upon the first detection of a surge event as indicated by the behavior of the compressor discharge pressure signal, the controller 130 executes surge recovery measures as described in detail hereinafter. The controller 130 is preprogrammed to permit only a certain maximum number of surge events to occur within a predetermined time period. Upon the occurrence of the maximum number of surge events, the compressor system is shutdown by the controller 130.

The controller 130 continuously monitors the temperature of the working fluid at the inlet of stage 12a by temperature sensor 202, and the temperature of the working fluid at the inlet of stage 12b by temperature sensor 129. If either of these two temperatures rises to a predetermined maximum value, the controller 130 will shutdown the system with a message to the operator that a continuous surge event has required system shutdown. In this manner, the centrifugal compressor and associated equipment is assured of protection against damage from repeated surging.

Figure 12:
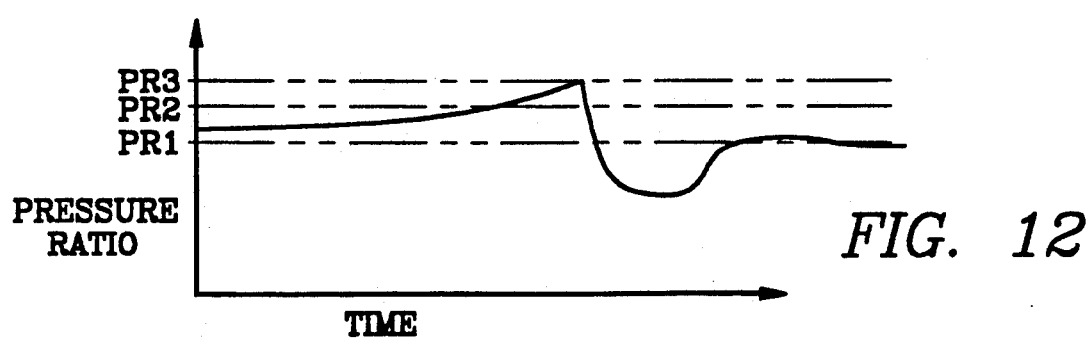
FIG. 12 is a graph of discharge pressure versus time of the FIG. 3 embodiment applying an impending surge detection and recovery response to an actual surge condition.

When a probable surge has been detected based on the discharge pressure dropping faster than a predetermined value, as described above, the controller 130 causes the blowoff valve 52 to quickly increase to a new position characterized by a larger opening angle. The larger blowoff valve area eliminates the surge condition and normal blowoff valve modulation is restarted based on a target compressor pressure ratio equal to PR1. FIG. 12 characterizes this response to a surge event and the resulting recovery therefrom. Simultaneous with the aforementioned adjustment of the blowoff valve 52 to recover from the surge event, the controller automatically decrements PR1 by a predetermined amount. For example, PR1 may be decremented by one percent 1% of its previous value when a surge event is detected. In this manner, the occurrence of a single surge event causes the controller 130 to self-correct by setting a target pressure ratio, PR1, lower than the last value. In order to allow for the possibility of nuisance surge events due to an external factor e.g., reduced cooling air flow in the case of an air-cooled system, the controller 130 automatically resets PR1 to an initial default value each time the controller is turned on and the system is restarted.

In operation, the controller regulates the inlet valve 24, the blowoff valve 52, and the speed control valve 74 to prevent and recover from a surge event, as will be described in further detail hereinafter. To perform its functions, the controller 130 receives relevant data from the following:

| | |
|---|---|
| Pressure transducer (9): | Barometric pressure, psia (PT0) |
| Pressure transducer (25): | Compressor inlet pressure, psia (PT1) |
| Pressure transducer (32): | Compressor dis. pressure, psia (PT2) |
| Pressure transducer (39): | Reservoir pressure, psig (PT3) |
| Temperature sensor (202): | Stage 1 inlet temperature, Deg. R (T1) |
| Temperature sensor (129): | Stage 2 inlet temperature, Deg. R (T2) |
| Compressor speed (18): | Compressor speed, RPM (V) |
| Setpoint pressure (122): | User selected, psig (PSET) |

At such time when the controller 130 is initially powered on by way of an operator panel 122 or a suitable device, the controller 130 receives the following data: barometric pressure (PT0) from the absolute pressure sensor 9; ambient temperature (T1) from temperature sensor 202; and setpoint pressure (PSET) from a user selection or switch selection on the operator panel 122. From this data, the controller 130 computes setpoint target speed to establish a desired minimum compressor surge margin. At a predetermined time when the compressor 10 is started, warmed up, loaded, and placed on-line, the controller 130 continuously regulates the inlet valve 24, the blowoff valve 52, and the speed control valve 74 to prevent and recover from a surge event.

The inlet valve 24 permits flow throttling, as directed by the controller 130, to achieve the desired setpoint discharge pressure PSET in the reservoir 38 as measured by pressure sensor 39, Regulation of the inlet valve 24 by the controller 130 is based upon a "proportional integral" or "PI" control technique as shown in FIGS. 3 and 4. As an example, for a typical 2-stage centrifugal compressor system, a flow turndown of 15% to 20% is possible by inlet valve throttling only prior to target pressure ratio, PR1, being reached.

The blowoff valve 52 is positioned by the controller 130 in response to overall compressor pressure ratio as previously described. When the compressor pressure ratio is less than the target value of PR1, the blowoff valve 52 is fully closed. In such a position, maximum flow is provided to a user at maximum efficiency. When compressor pressure ratio rises to PR1, the controller 130 begins to modulate the blowoff valve, through logic outlined in FIG. 13, to maintain the system pressure ratio at PR1. If the compressor pressure ratio rises to the maximum safe pressure ratio of PR2, the controller 130 will cause the blowoff valve to quickly reset and open to a predetermined position to relieve discharge pressure (see FIG. 11). If the compressor pressure ratio rises further to the actual surge point or critical pressure ratio, PR3, the compressor may surge and the controller will detect such surge by the rapid down spike in compressor discharge pressure. Surge recovery will then begin as shown in FIG. 12 which is based on a further direct opening of the blowoff valve 52 and a return to normal blowoff valve modulation.

The controller 130 continuously monitors the number of surges within any particular time interval, as well as the instantaneous value of the working fluid temperature at the inlet to any of the compressor stages. Should the above-described surge recovery technique fail to abort the surge for any reason, the compressor is automatically unloaded and shutdown to prohibit damage from occurring thereto.

Figure 15:
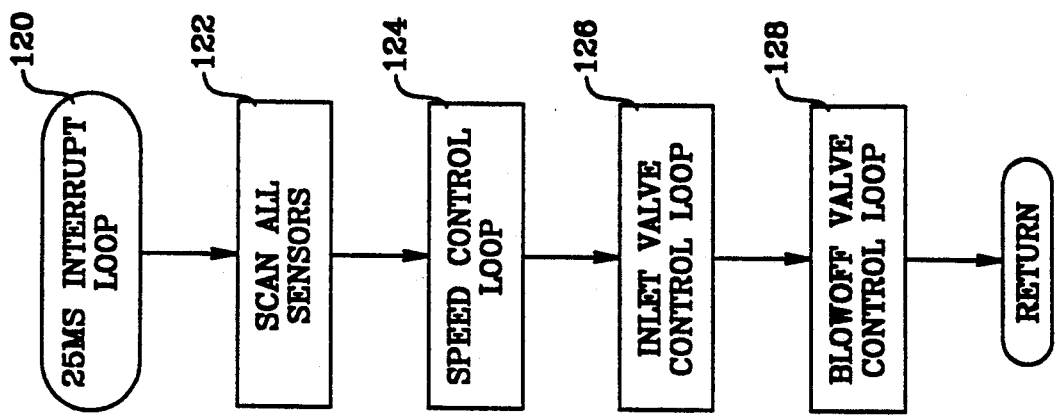
FIG. 15 is a flowchart of a 25 Msec interrupt control loop which is used in conjunction with the main controller software loop of FIG. 14.
Figure 14:
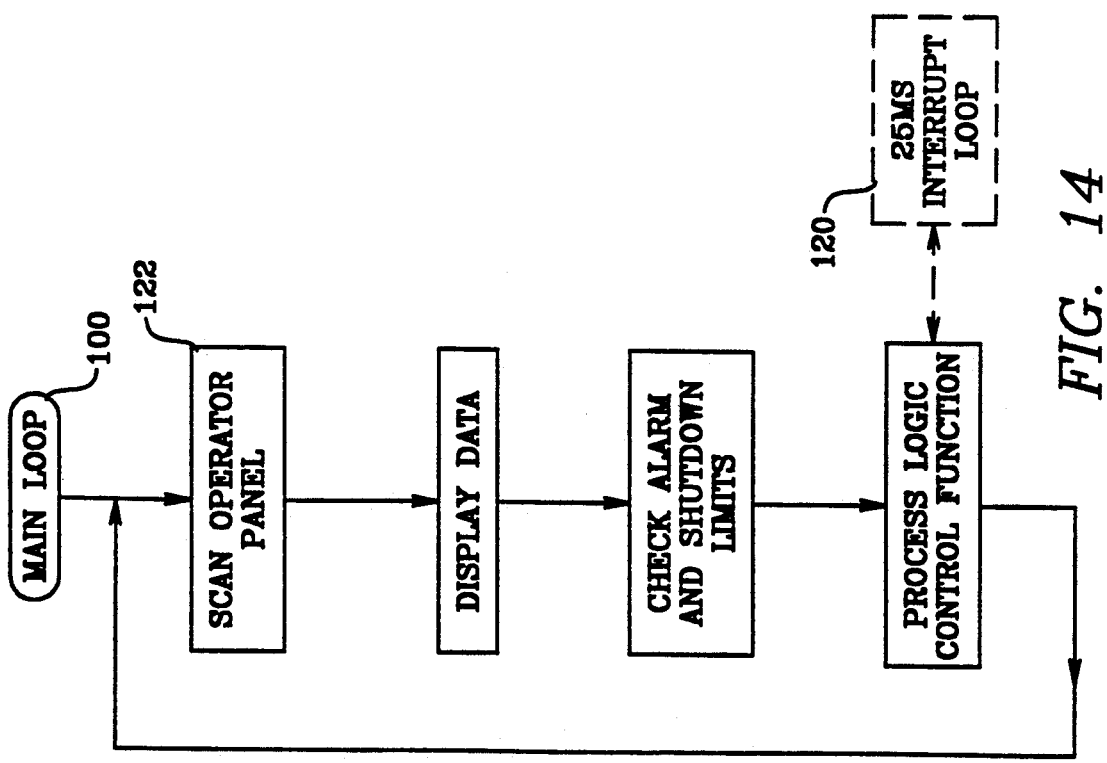
FIG. 14 is a flowchart of the main controller software loop of the invention.
Figure 16:
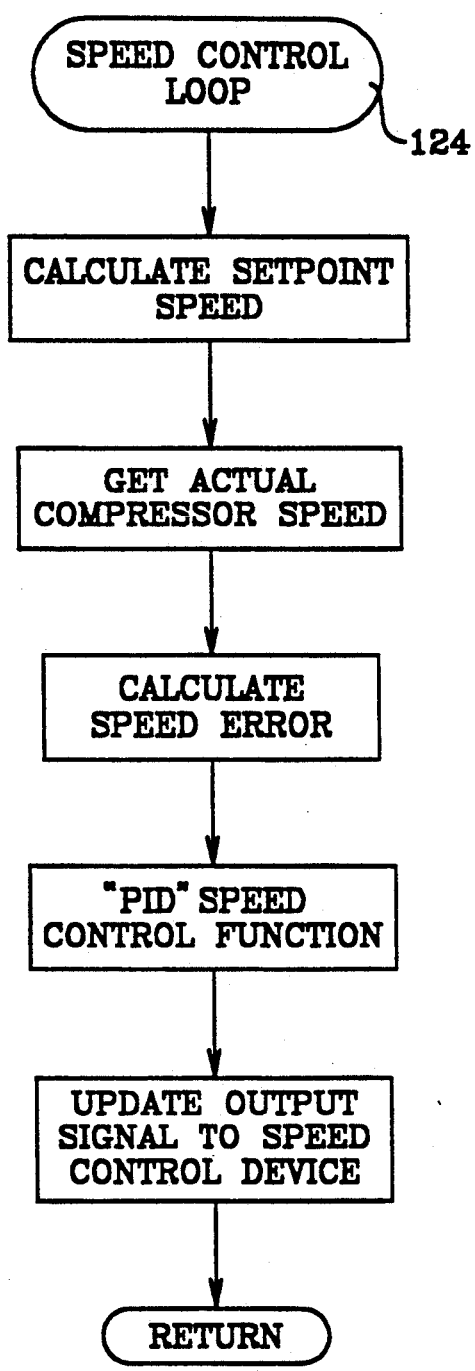
FIG. 16 is a flowchart of the speed control loop of FIG. 15.
Figure 18:
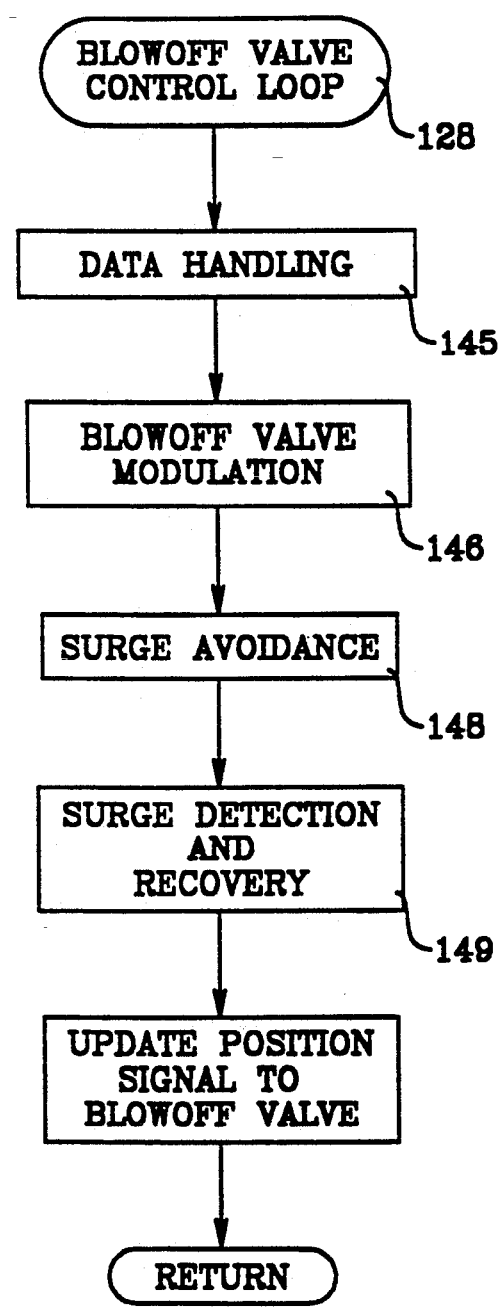
FIG. 18 is a flowchart of the blowoff valve control loop of FIG. 15.

In operation, the controller 130 repeatedly executes a main software control loop 100 based on the flowchart shown in FIG. 14. The execution of the main software control loop is interrupted each 25 milliseconds Msec to execute an interrupt control loop 120, the flowchart of which is shown in FIG. 15. The interrupt control loop 120 includes a scan loop 122; a prime mover speed control loop 124, which is flowcharted in FIG. 16; an inlet valve control loop 126, which is flowcharted in FIG. 17; and a blowoff valve control loop 128, which is flowcharted in FIG. 18.

The speed control loop 124 prevents surge by continuously controlling the rotational speed of the prime mover 14, such that the compressor surge margin is maintained at a desired level at a particular combination of altitude (PT0), ambient temperature (T1), and setpoint pressure (PSET). For example, speed may be adjusted to achieve a minimum of 8% surge margin at any full-flow operating condition. In this regard, setpoint speed is calculated by the controller 130 as outlined above. Rotational speed is controlled using a "proportional integral differential" or "PID" control technique based on the control transfer functions depicted in FIG. 9.

As should be understood, the output signal to the speed control device 74 varies with the type of variable-speed prime mover 14 employed. However, the output signal generally consists of an analog signal proportional to the level of speed required by the prime mover 14. In the case of an internal combustion engine, the signal may, as an example, be a pulse width modulated square wave signal to a rotary solenoid device connected to a fuel control valve on the engine (not shown). In the case of a variable-speed electric motor, the signal may, as an example, be an analog signal to a frequency control unit for motor speed variance (not shown).

The inlet valve control loop 126 maintains setpoint pressure by controlling the position of the inlet valve 24 to match compressor flow with actual flow demand. As shown in FIG. 5, the inlet valve 24 allows compressor flow turndown from the maximum possible value at a particular rotational speed of the compressor 10, to a value corresponding to a target safe maximum operating pressure ratio. The target safe maximum operating compressor pressure ratio is shown as PR1 in FIGS. 5, 10, 11, and 12. The inlet valve 24 is prevented from fully closing to prevent compressor surge from occurring during startup acceleration and while operating at warmup or unloaded idle speed.

The method of preventing full valve closure may vary, but will generally consist of either mechanical means or electrical means. In the case of a mechanical means, a mechanical stop may be employed that prevents full closure of the valve or throttling device 24. In the case of an electrical means, the controller 130 10 may have a limit on the amount of output signal, either low or high, depending on the inlet valve driver device. Alternatively, the inlet valve 24 may have a bypass area that allows a certain amount of flow to bypass the inlet valve directly to the impeller 11 of the first stage 12a of the centrifugal compressor 10. In this manner, the inlet valve 24 may be allowed to fully-close while the amount of bypass area insures a minimum flow that prevents surge at a particular operating speed. One very simple, yet effective, means of accomplishing minimum flow bypass area is to have a suitably sized opening within the valve plate of a butterfly-type inlet valve.

Figure 17:
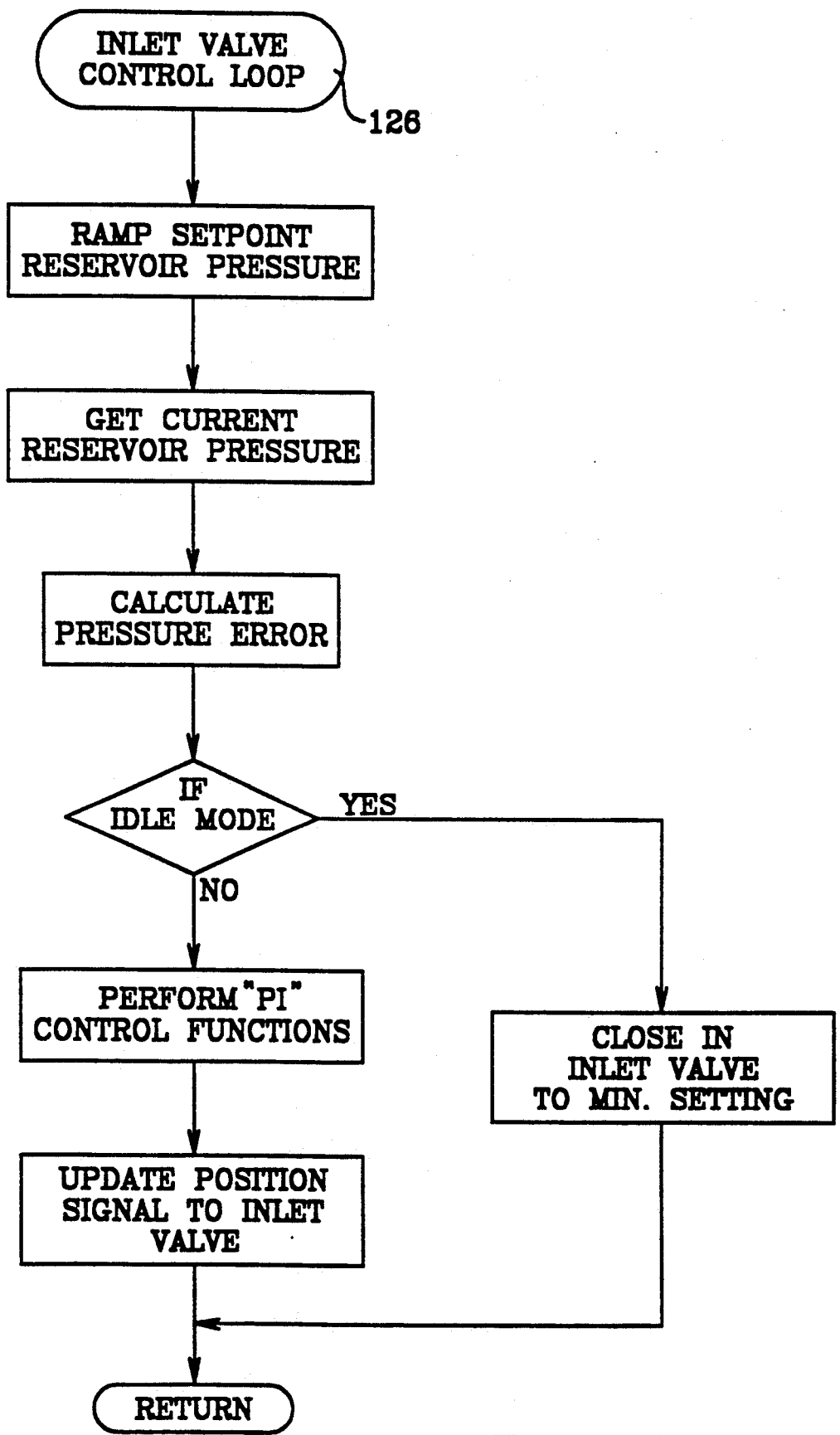
FIG. 17 is a flowchart of the inlet valve control loop of FIG. 15.

As shown in FIG. 17, the inlet valve control loop 126 calculates an error between the current measured pressure PT3 in the reservoir 38 and the setpoint reservoir pressure PSET, as selected by the operator by way of the operator panel 122. The controller 130 uses "proportional integral" or "PI" control techniques to properly position the inlet valve to continuously minimize the calculated pressure error.

FIG. 4 provides the control transfer functions used by the inlet valve control portion 126 of the controller 130 to achieve inlet valve modulation. The type of output signal from the inlet valve loop 126 to the inlet valve 24 varies with the type of inlet valve positioning device used. For example, the output signal may consist of an analog current signal varying between 4 and 20 milliamps used as an input signal to an electro-pneumatic valve positioning system employing a current-to-pressure transducer and a pneumatic valve positioner/actuator system. Also, the output signal may consist of a variable frequency signal used to drive a stepper motor driver on a butterfly valve unit.

The blowoff valve control loop 128 includes a data handling portion 145, a modulation portion 146, a surge avoidance portion 148, and a surge detection and recovery portion 149.

Figure 19:
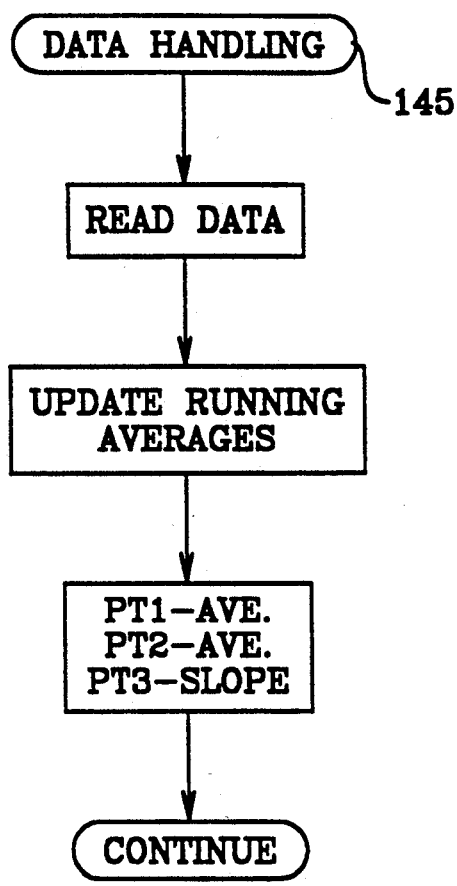
FIG. 19 is a flowchart of the data handling section of the blowoff valve control loop.

The data handling portion 145, as flowcharted in FIG. 19, reads pressures PT0, PT1, and PT2 which are provided by the pressure sensors or transducers 9, 25, and 32, respectively. To limit the effects of noise and electromagnetic interference in the signal from the pressure sensors, running averages of PT1 and PT2 are calculated for use in the pressure ratio calculation. An "averaging" section determines the rate of change in PT2, known as PT2-SLOPE, by using the latest four values of the running averages of PT2. The value of PT2-SLOPE is a running value, and it indicates to the controller 130 how quickly the pressure in the discharge port 30 is changing. This value is used to determine whether the slope of the pressure applied to PT2 is sufficiently steep to indicate a surge event.

Figure 20:
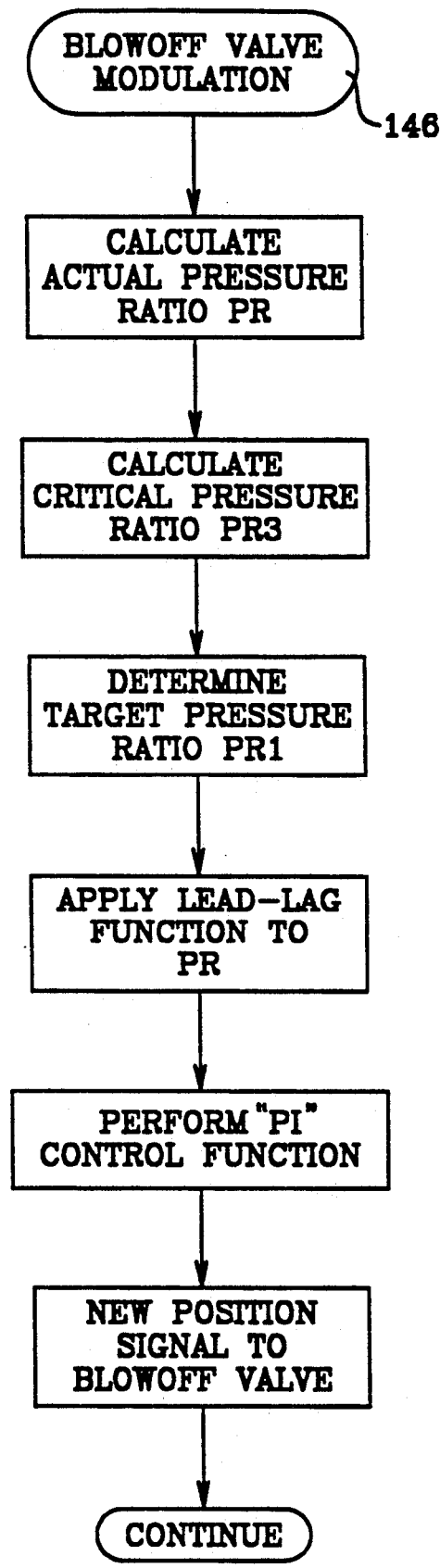
FIG. 20 is a flowchart of the blowoff valve modulation section of the blowoff valve control loop.

The modulation portion 146, as flowcharted in FIG. 20, first calculates the actual compressor pressure ratio, PR, by dividing the value of absolute pressure measured by sensor 32 (PT2) by the value of absolute pressure measured by sensor 25 (PT1). When pressure sensor 25 senses a vacuum in the inlet conduit 22, the actual absolute pressure in the inlet conduit 22 is computed by adding measured vacuum by pressure sensor 25 to the measured atmospheric or barometric pressure, as measured by pressure sensor 9. Next, the blowoff valve control loop 128 calculates the critical pressure ratio PR3 as a function of compressor corrected speed (see FIG. 5). As previously described, the critical pressure ratio, PR3, is the value of the compressor pressure ratio where compressor surge is expected to occur at a particular value of compressor corrected operating speed. Next, a value of the target safe pressure ratio PR1 is calculated by multiplying the critical pressure ratio, PR3, by a multiplier known as MSURGE. MSURGE is a fractional number used to determine the margin away from actual surge condition that the compressor should ideally operate. For example, MSURGE may be initially set at 0.92 each time the controller 130 is powered on. After PR1 is calculated, a pressure ratio error is then calculated as the difference between PR and PR1. Controller 130 uses "proportional integral" or "PI" control techniques, provided by FIG. 13, to minimize this error. This logic forces the blowoff valve 52 to close when actual pressure ratio, PR, is less than target pressure ratio, PR1. Conversely, the blowoff valve 52 is positioned further open when the actual pressure ratio, PR, is greater than the target pressure ratio, PR1.

Referring to FIG. 13, the average pressures are calculated by the averaging functions 171 and 174. The slope with respect to time of the average value of PT2 is calculated with the differential function 172. This slope is compared to a specified setpoint MAXSLOPE in the surge detection and recovery function, 173. The pressure ratio is calculated by the division function 175 and then processed by the lead-lag integrator 176.

The target pressure ratio is determined by first calculating PR3 with the surge pressure ratio function 179, and then multiplying by MSURGE in function 180. The control error is calculated by the SUM function 181 and the output signal to the blowoff valve 52 is calculated in the P-I control function 182. The maximum safe pressure ratio, PR2, is calculated by the multiply function 178, and is compared to the actual ratio, PR, in the surge avoidance function 177.

Figure 21:
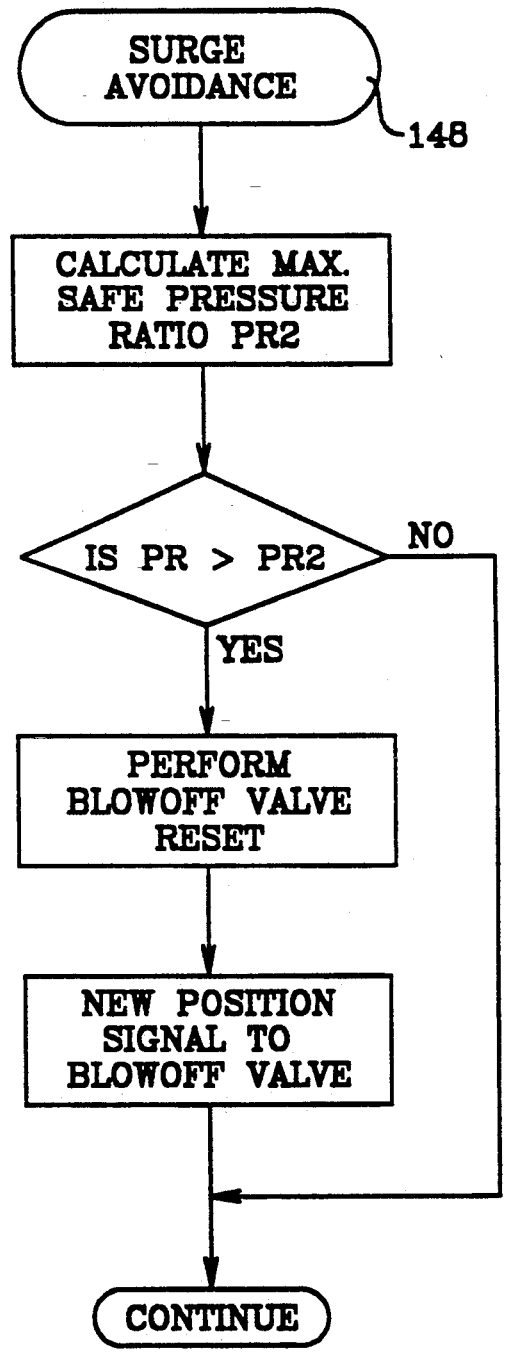
FIG. 21 is a flowchart of the surge avoidance section of the blowoff valve control loop.

The surge avoidance portion 148, as flowcharted in FIG. 21, permits a quick reset of the blowoff valve 52 to a more open position if the actual compressor pressure ratio rises above the target value and reaches the maximum safe operating pressure ratio, as explained in further detail hereinafter.

During each pass through the blowoff valve loop 128, the controller 130 compares the actual pressure ratio, PR, to the maximum safe operating compressor pressure ratio, PR2, which is calculated by multiplying the critical pressure ratio, PR3, by a multiplier known as MPOP. MPOP is a fractional number used to determine the pressure ratio at which the "PI" controls of the blowoff valve should stop to perform a quick reset on the blowoff valve 52 to quickly lower the actual pressure ratio below PR2. This technique of quickly resetting or "popping" the blowoff value to a predetermined open position is a technique of surge prevention or avoidance. A final product of every pass through of the blowoff valve control loop 128 is a new position for the blowoff valve 52.

Figure 22:
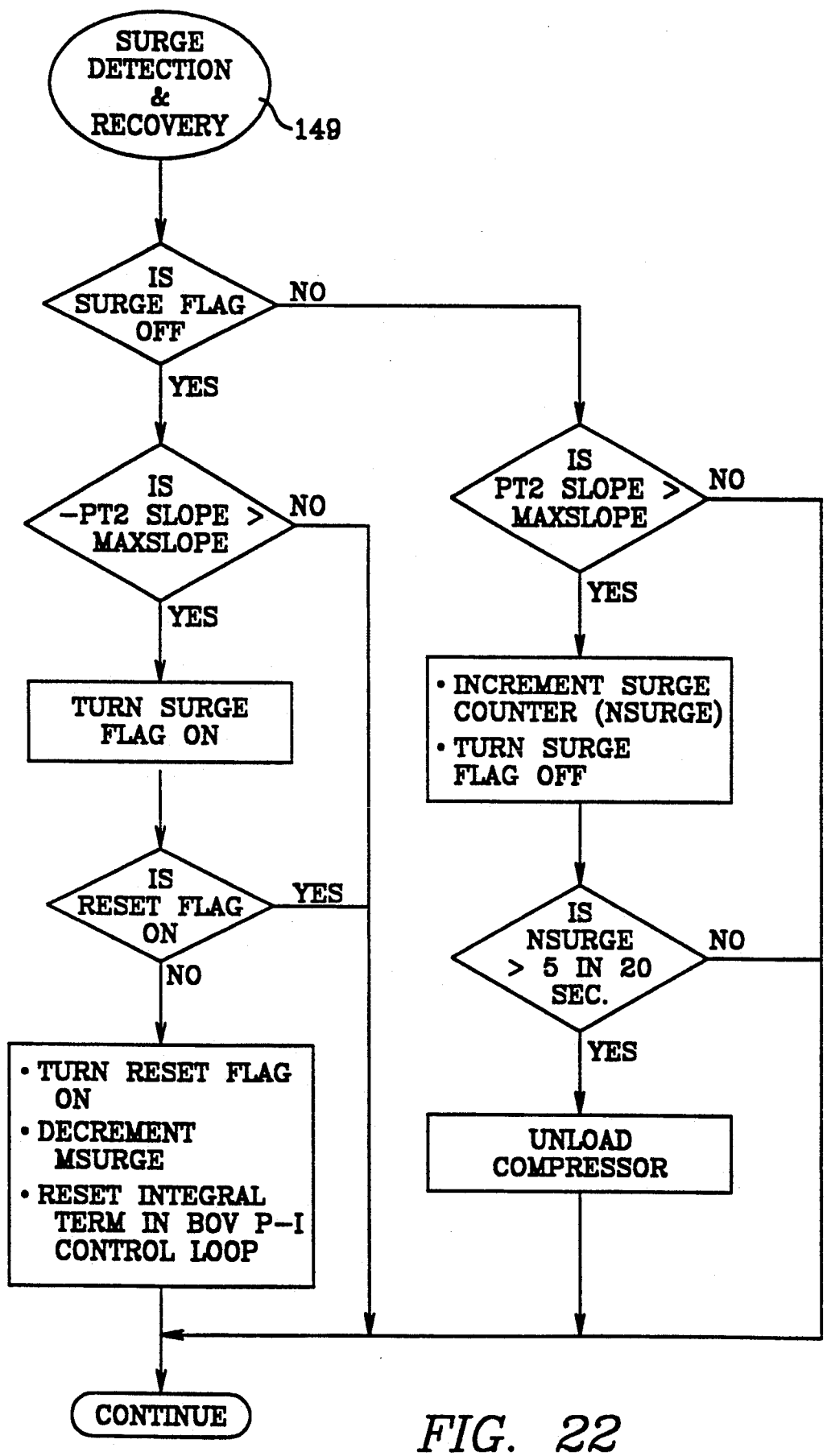
FIG. 22 is a flowchart of the surge detection and recovery section of the blowoff valve control loop.

The surge detection and recovery portion 149, as flowcharted in FIG. 22, is a method of detecting an actual surge event and reacting to the surge event so as to recover therefrom without unloading or shutting down the compressor. Section 149 of the blowoff valve loop 128 performs a surge check during each pass through the blowoff valve control loop 128.

As provided by FIG. 22, the controller 130 calculates the slope with respect to time of the actual compressor discharge pressure, PT2. If this slope, known as PT2-SLOPE, is more negative i.e., a downward spike, than a particular predetermined value, the controller initiates a surge recovery action known as "surge reset". In a surge reset, the controller 130 quickly adjusts the value of the blowoff valve position to a predetermined open position so as to relieve the high pressure ratio condition. Once done, the blowoff valve loop 128 resumes normal "PI" control or modulation of the blowoff valve 52 so as to achieve the response to a surge shown in FIG. 12. Simultaneous with the surge reset action, the controller 130 decrements MSURGE in order to avoid yet a second surge condition. Any time that a surge reset occurs, the logic provides that a specified amount of time must expire before repeating the surge reset action. This time period gives the modulation portion 146 time to regain control of the compressor without being interrupted by subsequent resets.

Once a down spike has been detected, the controller 130 sets a software flag indicating that a probable surge is occurring. On subsequent scans for a predetermined time period, e.g., 2 seconds, the controller 130 checks for a following upward spike in compressor discharge pressure that exceeds a particular predetermined value. If found, the controller 130 proclaims that a definite surge has occurred. If a predetermined number of surges occurs within a predetermined time period, the controller 130 causes the compressor to shut down.

The type of output signal from the blowoff valve loop 128 to the blowoff valve 52 varies with the type of blowoff valve positioning device used. For example, it may consist of an analog current signal varying between 4 and 20 milliamps used as an input signal to an electropneumatic valve positioning system employing a current-to-pressure transducer and a pneumatic valve positioner/actuator system. Also, the output may consist of a variable frequency signal used to drive a stepper motor driver on a butterfly valve unit. The exact type of blowoff valve positioning device is independent of this embodiment.

While this invention has been illustrated and described in accordance with a preferred embodiment, it is recognized that variations and changes may be made therein without departing from the invention as set forth in the following claims.

Having described the invention, what is claimed is:

1. In a centrifugal compressor having an inlet valve, an inlet port, a discharge port, and at least one compressor stage, a method of preventing fluid surge comprising the following steps:
   sensing ambient absolute pressure;
   generating a first signal corresponding to the ambient absolute pressure;
   sensing ambient temperature at the inlet port of the compressor;
   generating a second signal corresponding to the ambient temperature;
   sensing a predetermined compressor setpoint discharge pressure;
   generating a third signal corresponding to the compressor setpoint discharge pressure;
   sensing the actual compressor speed;
   generating a fourth signal corresponding to the actual compressor speed;
   inputting the first, second, third and fourth signals to a controller having a characteristic map which provides comparator speeds at which fluid surge occurs at predetermined ambient conditions;
   calculating a target compressor speed as a function of the ambient absolute pressure, the ambient temperature, and the setpoint discharge pressure;
   controlling the actual compressor speed using a proportional integral derivative control device to achieve the target compressor speed to thereby maintain a predetermined margin from the mapped compressor speed to prevent fluid surge; and
   controlling positioning of the inlet valve by employing proportional integral logic to match compressor flow with actual compressor flow demand, the inlet valve being prevented from fully closing to prevent compressor source from occurring during startup, acceleration, operation at warmup compressor speeds, and operation at compressor unloaded idle speeds.

2. In a centrifugal compressor having an inlet port, a discharge port, and at least one compressor stage, a method of detecting a fluid surge comprising the following steps:
   sensing compressor discharge pressure;
   generating a discharge pressure signal corresponding to the compressor discharge pressure;
   sensing the temperature of the fluid at the inlet of the first compressor stage;
   generating a first temperature signal corresponding to the temperature at the first stage inlet;
   sensing the temperature of the fluid at the inlet of the second stage;
   generating a second signal corresponding to the temperature at the second stage inlet;
   inputting the discharge pressure signal and the first and second temperature signals to a controller;
   monitoring the first and second temperature signals;
   shutting down the compressor if at least one of the first and second signals rises to a predetermined maximum value;
   calculating as a running value a time rate of change of the discharge pressure;
   comparing the rate of change of the compressor discharge pressure to a predetermined rate of change which represents a fluid surge occurrence;
   indicating the occurrence of a probable fluid surge if the absolute value of the rate of drop in discharge pressure exceeds the predetermined rate of change;
   monitoring the discharge pressure signal to determine if the discharge pressure condition which indicates a probable surge is followed by a predetermined discharge pressure rate of increase;
   indicating the occurrence of a definite surge if any discharge pressure condition which indicates a probable surge is followed by a predetermined discharge pressure rate of increase;
   incrementing a counter to count the number of definite surges which have occurred within a certain time period; and
   shutting down the compressor upon the occurrence of a predetermined number of definite surges within a predetermined period of time.

3. In a centrifugal compressor having an inlet port, a discharge port, at least one compressor stage, a method of preventing fluid surge, the method comprising:
   sensing the absolute compressor inlet pressure;
   generating a first signal corresponding to the absolute compressor inlet pressure;
   sensing the absolute compressor discharge pressure;
   generating a second signal corresponding to the absolute compressor discharge pressure;
   inputting the first and second signals to a controller;
   calculating the actual compressor pressure ratio by dividing the value of absolute compressor discharge pressure by the value of absolute inlet pressure;
   calculating a critical pressure ratio at which surge is expected to occur at a particular value of compressor speed;
   calculating a target safe pressure ratio by multiplying the critical pressure ratio by a predetermined fractional multiplier;

calculating a pressure ratio error as the difference between the actual compressor ratio and the target safe ratio;

continuously modulating a compressor blowoff valve by the controller in response to the pressure ratio error, such that the controller positions the blowoff valve to a more closed position when the actual pressure ratio is less than the target safe pressure ratio, and such that the controller positions the blowoff valve to a more open position when the actual pressure ratio is greater than the target safe pressure ratio.

4. A method of preventing fluid surge as claimed in claim 3, the method further comprising:

calculating a maximum safe operating pressure ratio by multiplying the critical pressure ratio by a predetermined fractional multiplier;

comparing the actual pressure ratio to the maximum safe operating pressure ratio to determine if the actual pressure ratio exceeds the maximum safe operating pressure ratio;

ceasing to modulate the blowoff valve if the actual pressure ratio exceeds the maximum safe operating pressure ratio; and resetting the blowoff valve to quickly lower the actual pressure ratio below the maximum safe operating ratio to prevent a fluid surge without unloading the compressor.

5. A method of preventing fluid surge as claimed in claim 4, wherein the controller employs proportional integral logic to position the blowoff valve.

6. A method of preventing fluid surge as claimed in claim 5, wherein the controller performs a compressor speed signal reset simultaneously with the reset of the blowoff valve to prevent compressor overspeed from occurring due to the sudden load drop associated with the blowoff valve reset function.

7. A method of preventing surge as claimed in claim 4, the method further comprising:

preventing future surge events based on the occurrence of a past surge event by modifying the target safe pressure ratio each time a single surge event occurs.

8. In a centrifugal compressor system having a variable-speed prime mover, an inlet valve, an inlet port, a discharge port, a reservoir, and at least one compressor stage, a fluid surge control apparatus comprising:

a first pressure sensor for measuring absolute ambient pressure;

a second pressure sensor for measuring absolute compressor inlet pressure;

a third pressure sensor for measuring absolute compressor discharge pressure;

a fourth pressure sensor for measuring gauge reservoir pressure;

a first temperature sensor for measuring the inlet temperature at the compressor stage;

a controller, the controller having a characteristic map which provides the pressure ratio at which fluid surge occurs versus compressor corrected speed;

means for selecting compressor discharge pressure;

first means for preventing surge in the compressor, the first surge prevention means calculating a target compressor speed as a function of the ambient absolute pressure, the ambient temperature, and the setpoint discharge pressure, the target compressor speed maintaining a predetermined minimum margin from the mapped compressor speed to prevent a fluid surge;

second means for preventing surge in the compressor, the second surge prevention means continuously controlling positioning of the inlet valve to match compressor flow with actual compressor flow demand, the inlet valve being prevented from fully closing to prevent compressor surge from occurring during startup, acceleration, operation at warmup compressor speeds, and operation at compressor unloaded idle speeds;

a third means for preventing surge in the compressor, the third surge prevention means calculating the actual compressor pressure ratio by dividing the value of absolute compressor discharge pressure by the value of absolute inlet pressure, calculating a critical pressure ratio at which surge is expected to occur at a particular value of compressor speed, calculating a target safe pressure ratio by multiplying the critical pressure ratio by a predetermined fractional multiplier, calculating a pressure ratio error as the difference between the actual compressor ratio and the target safe ratio, and continuously modulating a compressor blowoff valve by the controller in response to the pressure ratio error, such that the controller positions the blowoff valve to a more closed position when the actual pressure ratio is less than the target safe pressure ratio, and such that the controller positions the blowoff valve to a more open position when the actual pressure ratio is greater than the target safe pressure ratio; and a means for detecting surge in the compressor, the surge detection means calculating as a running value a time rate of change of a drop in discharge pressure, comparing the rate of change of the compressor discharge pressure signal to a predetermined rate of change which represents a fluid surge occurrence, and indicating the occurrence of a probable fluid surge if the absolute value of the drop in discharge pressure exceeds the predetermined rate of change.

* * * * *